US010379392B2

(12) United States Patent
Noguchi et al.

(10) Patent No.: US 10,379,392 B2
(45) Date of Patent: Aug. 13, 2019

(54) DISPLAY DEVICE COMPRISING BACKLIGHT DEVICE, DETECTION ELECTRODES, AND ELASTIC MEMBER

(71) Applicant: Japan Display Inc., Tokyo (JP)

(72) Inventors: Koji Noguchi, Tokyo (JP); Takafumi Suzuki, Tokyo (JP); Yasuyuki Teranishi, Tokyo (JP); Yosuke Nakamori, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/692,448

(22) Filed: Aug. 31, 2017

(65) Prior Publication Data

US 2018/0059480 A1    Mar. 1, 2018

(30) Foreign Application Priority Data

Aug. 31, 2016 (JP) .................................. 2016-169601

(51) Int. Cl.
| | | |
|---|---|---|
| *G02F 1/1333* | (2006.01) | |
| *G02F 1/1335* | (2006.01) | |
| *G06F 3/041* | (2006.01) | |
| *G06F 3/044* | (2006.01) | |
| *G02F 1/1343* | (2006.01) | |

(52) U.S. Cl.
CPC .... *G02F 1/13338* (2013.01); *G02F 1/133608* (2013.01); *G06F 3/044* (2013.01); *G06F 3/0412* (2013.01); *G02F 1/1343* (2013.01); *G02F 2201/36* (2013.01); *G02F 2201/50* (2013.01); *G06F 3/0414* (2013.01); *G06F 3/0416* (2013.01); *G06F 2203/04105* (2013.01)

(58) Field of Classification Search
CPC ........... G02F 1/13338; G02F 1/133608; G02F 2201/50; G02F 2201/54; G02F 3/044
See application file for complete search history.

(56) References Cited

U.S. PATENT DOCUMENTS

2012/0218494 A1    8/2012  Nakayama et al.
2017/0285830 A1*  10/2017  Choi ..................... G06F 3/0412

FOREIGN PATENT DOCUMENTS

| JP | 2009-169523 A | 7/2009 |
| JP | 2012-177798 A | 9/2012 |

\* cited by examiner

*Primary Examiner* — Paisley L Arendt
(74) *Attorney, Agent, or Firm* — K&L Gates LLP (57) ABSTRACT

According to one embodiment, a display device includes a display panel including a first substrate including a display area and a first detection electrode, a backlight device opposed to the first substrate with a gap therebetween, a second detection electrode opposing the first detection electrode via the backlight device, and an elastic member between the backlight device and the second detection electrode, including a first region opposing a central portion of the back light device and a second region located to surround the first region. The first region and the second region are different in hardness in a thickness direction of the elastic member.

12 Claims, 8 Drawing Sheets

DISPLAY DEVICE COMPRISING BACKLIGHT DEVICE, DETECTION ELECTRODES, AND ELASTIC MEMBER

CROSS-REFERENCE TO RELATED APPLICATIONS

This application is based upon and claims the benefit of priority from Japanese Patent Application No. 2016-169601, filed Aug. 31, 2016, the entire contents of which are incorporated herein by reference.

FIELD

Embodiments described herein relate generally to a force sensing device and a display device comprising the same.

BACKGROUND

In recent years, liquid crystal display devices and organic electroluminescent (EL) display devices are widely used as display devices of a smartphone, personal assistant device (PAD), tablet computer, car navigation system, and the like. In general, a liquid crystal display device comprises a liquid crystal panel, and a lighting device (backlight device) overlaid on the rear surface of the liquid crystal panel. The backlight device includes a reflective layer, a light guide plate, an optical sheet, a light source such as an LED, a rectangular frame and the like.

Regarding the liquid crystal display device, a display device provided with a force sensing function of sensing a pressing force applied on the display surface to thereby carry out an arbitrary operation has been proposed. Such a display device adopts an input detection mode of an electrostatic capacitance system of detecting a pressing force, in which a change in a distance between two electrodes provided in the liquid crystal display device is converted into a change in electrostatic capacitance. It is preferable for such a liquid crystal display device that the distance between the two electrodes linearly changes with respect to the pressing force in a thickness direction (an external force in a thickness direction). Further, one electrode is moved or displaced toward the other electrode, the inter-electrode distance changes. Therefore, in order to detect a large pressing force, it is necessary to secure sufficient amount of displacement of the electrode (the amount of stroke).

In order to secure the amount of displacement, an air layer is provided between the electrodes. Furthermore, in order to secure more amount of displacement, an elastic member such as cushion material may be disposed between the electrodes.

In the liquid crystal display comprising a force sensing function utilizing the difference in capacitance between two electrodes as mentioned above, if a relatively thin glass substrate, a cover panel or the like is adopted to slim down the body, the amount of deformation of the glass substrate and the electrodes becomes large according to the inputted pressing force. Under these circumstances, in order to be able to detect a larger pressing force, it is necessary to increase the thickness of the air layer. However, in this case, the thickness of the entire liquid crystal display device is increased, which contradicts the slimming down of the body.

When a cushion material is provided to secure the amount of deformation of the glass substrate and the electrodes, a point of inflection is created in detection of a pressing force between a region deformed within the air layer and a region deformed by the elastic deformation of the cushion material. Further, the point of inflection is varied depending on the place of the display device, more specifically, the place where a pressing force is applied. As a result, it becomes difficult to uniformly detect the pressing force over the entire surface of the display device.

SUMMARY

The present disclosure generally relates to a display device and a force sensing device.

According to one embodiment, a display device includes a display panel including a first substrate including a display area and a first detection electrode, a backlight device opposed to the first substrate with a gap there between, a second detection electrode opposing the first detection electrode via the backlight device, and an elastic member between the backlight device and the second detection electrode, including a first region opposing a central portion of the back light device and a second region located to surround the first region. The first region and the second region are different in hardness in a thickness direction of the elastic member.

Additional features and advantages are described herein, and will be apparent from the following Detailed Description and the figures.

DETAILED DESCRIPTION

Various embodiments will be described hereinafter with reference to the accompanying drawings. In general, according to one embodiment, a display device comprises a display panel comprising a first substrate including a display area and a first detection electrode, a backlight device opposed to the first substrate with a gap therebetween, a second detection electrode opposing the first detection electrode via the backlight device, and an elastic member between the backlight device and the second detection electrode, comprising a first region opposing a central portion of the back light device and a second region located to surround the first region. The first region and the second region are different in hardness in a thickness direction of the elastic member.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, the same structural elements as those described in connection with preceding drawings are denoted by like reference numbers, detailed description thereof being omitted unless necessary.

First Embodiment

Figure 1:
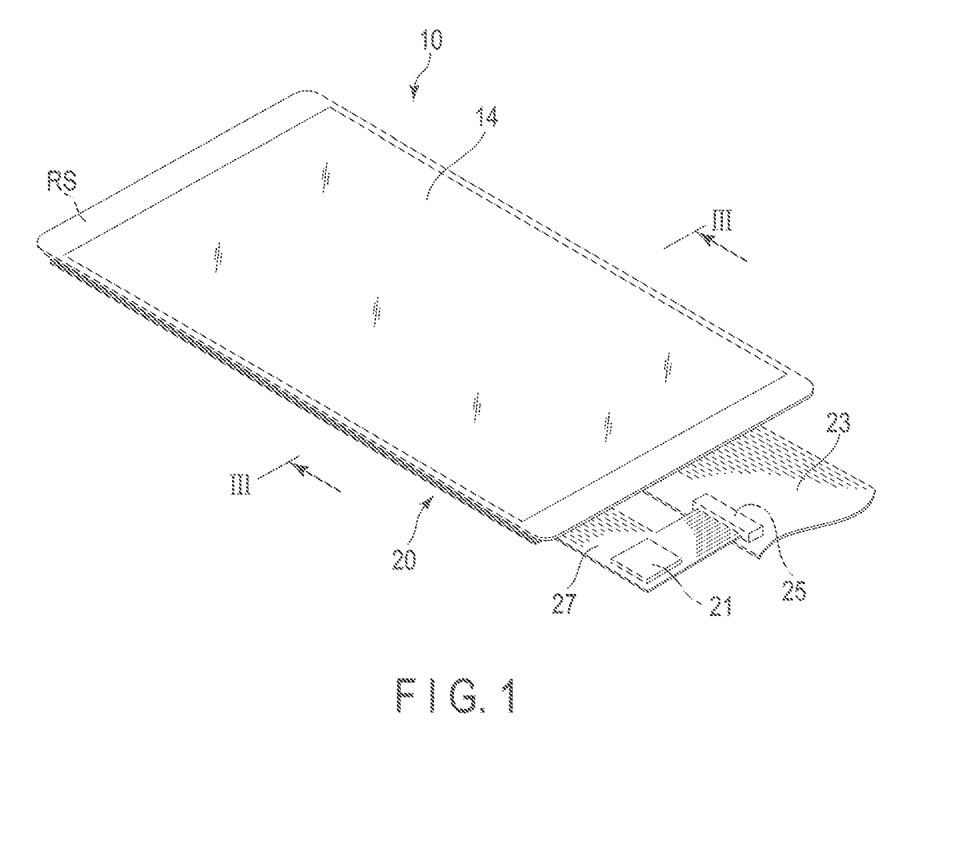
FIG. 1 is a perspective view showing the display surface side of a liquid crystal display device according to a first embodiment.
Figure 2:
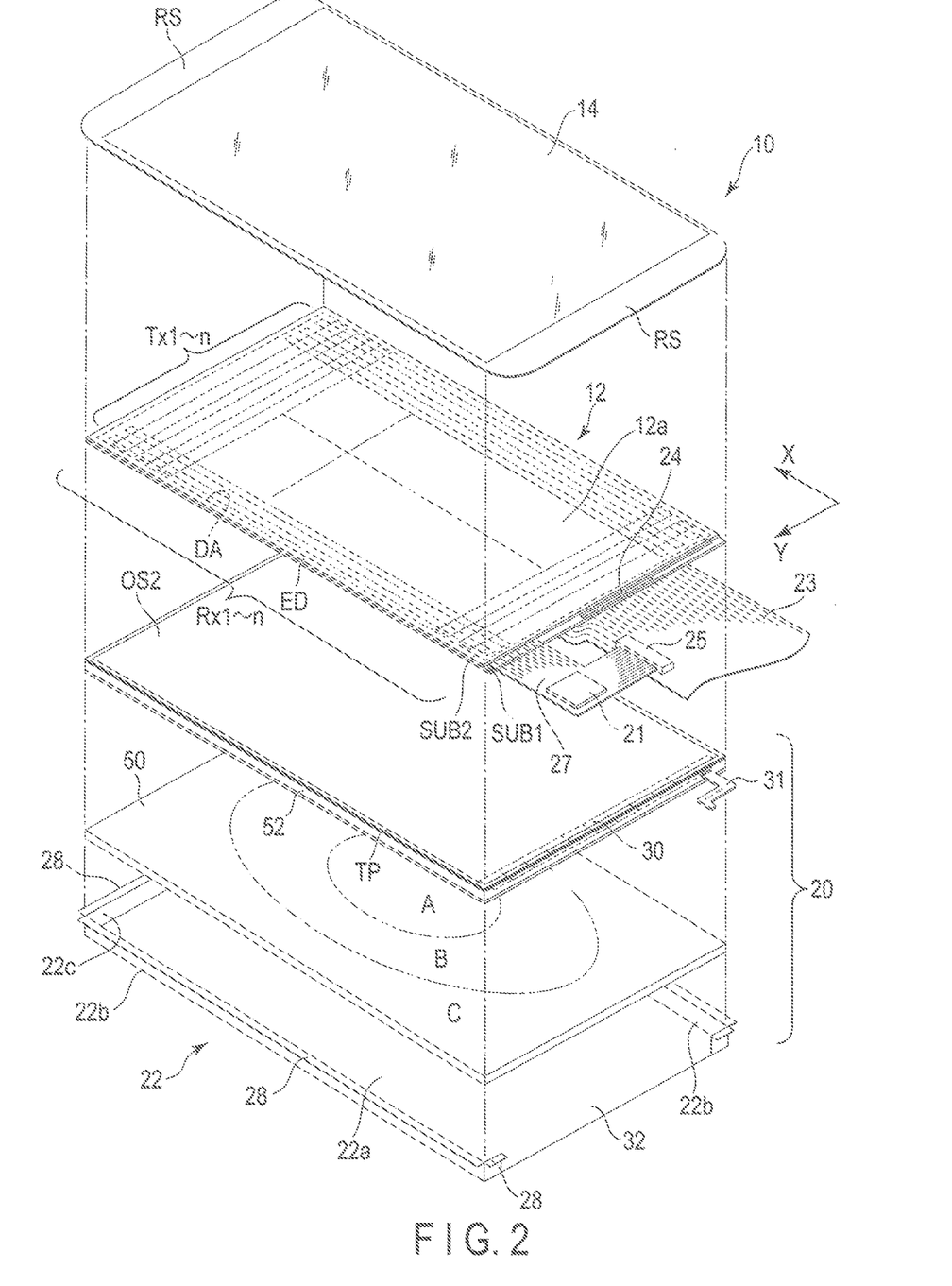
FIG. 2 is an exploded perspective view of the liquid crystal display device.

FIG. 1 is a perspective view showing the display surface side of a liquid crystal display device according to the first embodiment, and FIG. 2 is an exploded perspective view of the liquid crystal display device.

A liquid crystal display device 10 can be incorporated into various kinds of electronic devices such as smartphones, tablet computers, mobile phones, notebook computers, portable game consoles, electronic dictionaries, television sets, vehicle-navigation systems and vehicle-mounted display panels, to be used.

As shown in FIGS. 1 and 2, the liquid crystal display device 10 comprises an active-matrix liquid crystal panel (display panel) 12, a transparent cover panel 14 overlaid on a display surface 12a which is one surface of the liquid crystal panel 12 and configured to cover the entire display surface 12a, and a backlight unit (backlight device) 20 provided on the rear side of the liquid crystal panel 12 equivalent to the other surface of the liquid crystal panel 12 so as to face the rear side. The cover panel 14 may be omitted according to the circumstances of use.

Figure 3:
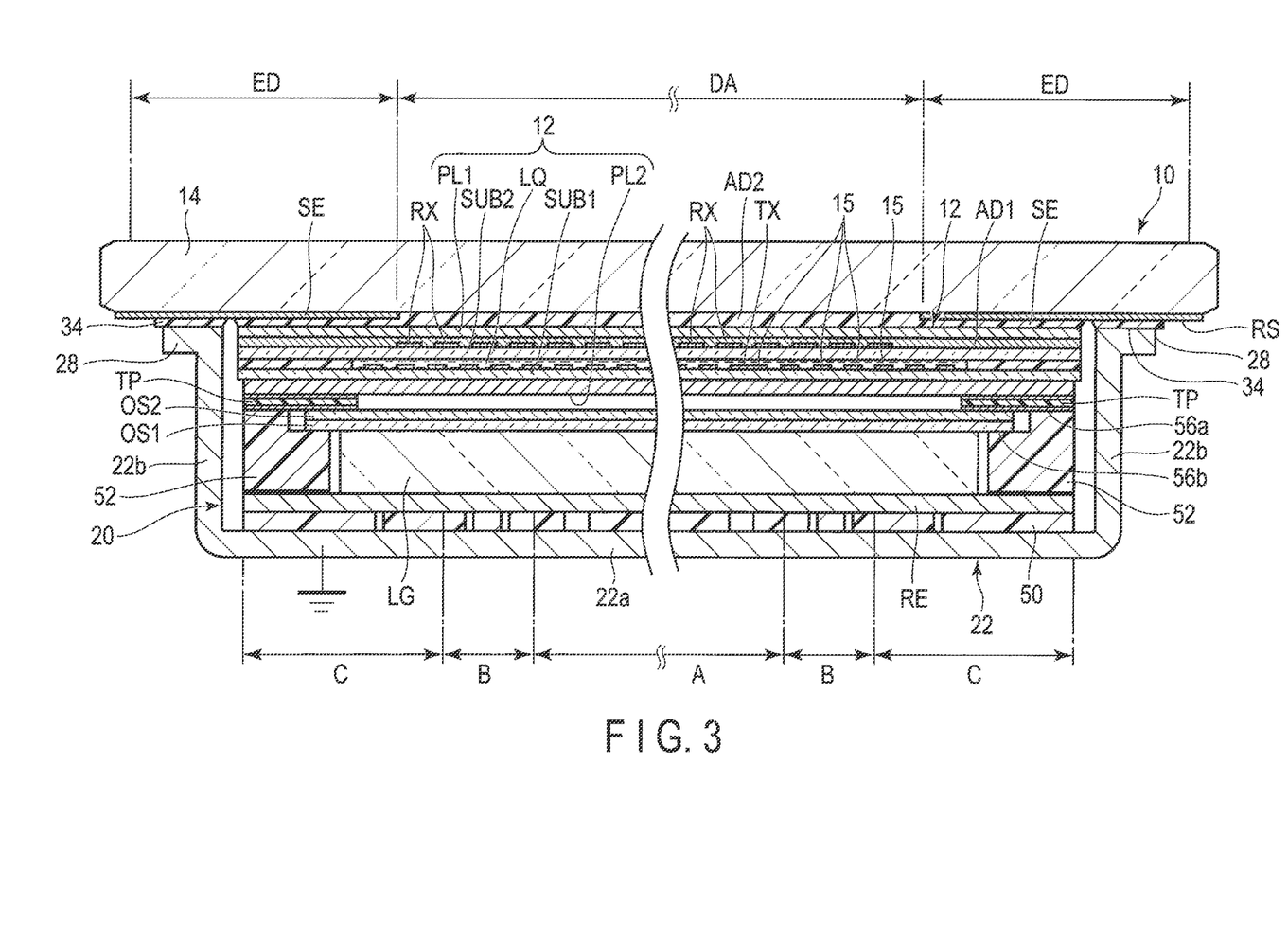
FIG. 3 is a cross section of the liquid crystal display taken along line A-A of FIG. 1.

FIG. 3 is a cross-sectional view of the liquid crystal display device taken along line A-A of FIG. 1. As shown in FIGS. 2 and 3, the liquid crystal panel 12 comprises a rectangular flat first substrate SUB1, a rectangular flat second substrate SUB2 opposing the first substrate SUB1, and a liquid crystal layer LQ sealed in between the first substrate SUB1 and the second substrate SUB2. The circumferential portion of the second substrate SUB2 is attached to the first substrate SUB1 with a sealing member SE. A polarizer PL1 is attached to the surface of the second substrate SUB2 to form the display surface 12a. A polarizer PL2 is attached to a surface (the rear surface of the liquid crystal panel 12) of the first substrate SUB1.

A plurality of electrode parts 15 such as a pixel electrode and a common electrode, and wiring lines (not shown), etc., are formed on at least one substrate, for example, on an inner surface of the first substrate SUB1. In this embodiment, a common electrode Vcom function also as a plurality of first detection electrodes Tx1 to Txn which constitute a touch sensor and a force detection sensor. The first detection electrodes Tx1 to Txn are formed into a stripe shape and each extend along a longitudinal direction of the first substrate SUB1 (a first direction X). Further, the first detection electrodes Tx1 to Txn are arranged parallel to each other with predetermined gaps therebetween in a width direction (a second direction Y) orthogonally crossing the longitudinal direction. On an upper surface of the second substrate SUB2, a plurality of second touch detection electrodes Rx1 to Rxn which constitute the touch sensor are formed. The second touch detection electrodes Rx1-Rxn are formed in a stripe shape and each extend in a width direction of the second substrate SUB2 (the second direction Y), that is, the direction orthogonally crossing the extending direction of the first detection electrodes Tx1 to Txn. The second touch detection electrodes Rx1-Rxn are arranged parallel to each other with predetermined gaps therebetween in the longitudinal direction of the second substrate SUB2. Note that the first detection electrodes Tx1 to Txn and the second touch detection electrodes Rx1 to Rxn are transparent electrodes each formed of, for example, ITO.

The Polarizer PL1 is attached to the upper surface of the second substrate SUB2 to be overlaid on the second touch detection electrodes Rx1 to Rxn, with an adhesion member AD1 made from, for example, an optical transparent resin.

Incidentally, the self-sensing mode is known, in which electrodes Vcom of a liquid crystal panel are arranged in a matrix, and contact (approach or touch) of a finger is detected by sensing the electrodes arranged in a matrix. This mode can be easily possible applied to the liquid crystal panel 12.

On the liquid crystal panel 12, a rectangular display area (active area) DA is provided in a region of an inner side of the sealing member SE as the liquid crystal panel 12 is seen in plan view (in other words, when the liquid crystal panel is seen from the normal direction of the display surface of the liquid crystal panel). An image is displayed on the display area DA. A rectangular frame area (non-display area) ED is provided around the display area DA. The liquid crystal panel 12 is of a transmissive type having a transmissive display function of displaying images by selectively transmitting the light from the backlight unit 20 to the display area DA. The liquid crystal panel 12 may have a structure provided for the lateral electric field mode which mainly utilizes a lateral electric field parallel to the main surface of the substrate, or a structure provided for the vertical electric field mode which mainly utilizes a vertical electric field crossing the main surface of the substrate.

The cover panel 14 is formed of a glass plate or acrylic transparent resin into the shape of a rectangular plate. On the peripheral portion of the rear surface of the cover panel 14, a frame-shaped light-shielding layer RS is formed. The rear surface of the cover panel 14 is attached to the polarizer PL1 with an adhesive member AD2 formed from an optical transparent resin, for example, to cover the entire surface of the display surface 12a of the liquid crystal panel 12. In the cover panel 14, the regions other than that opposes the display area DA of the liquid crystal panel 12 are shielded by the light-shielding layer RS.

As shown in FIG. 1 and FIG. 2, a semiconductor device such as a drive IC 24 is mounted on a short-side end of the first substrate SUB1. The drive IC 24 is as a signal supply source which supplies signals required to drive the liquid crystal panel 12. The drive IC 24 is formed into a slender rectangular shape and mounted on the first substrate SUB1 along a short-edge of the second substrate SUB2. The drive IC 24 supplies video signals and drive signals to the wiring lines and the pixel electrodes, and touch-detection drive signals to the first detection electrodes Tx1 to Txn. Further, a flexible printed circuit substrate (main FPC) 23 is joined to a short-side end of the first substrate SUB1, so as to extend from the liquid crystal panel 12 to the outside. The main FPC 23 is electrically connected to the drive IC 24 via a plurality of wiring lines (not shown) on the first substrate SUB1. A connector 25 may be mounted on the main FPC 23.

A relay FPC 27 is joined to the short side end of the second substrate SUB2. The relay FPC 27 is electrically connected to second touch detection electrodes Rx1 to Rxn formed on the second substrate SUB2. A touch IC (detection drive element) 21 is mounted on the relay FPC 27. Further, the extending end of relay FPC 27 is connected to the connector 25 on the main FPC 23, and electrically connected to the drive IC 24 through the connector 25 and the main FPC 23. The touch IC 21 contains a detector. The detector receives detection signals sent from the second detection electrodes Rx1-Rxn through the relay FPC 27 in a touch detection period.

As shown in FIG. 2 and FIG. 3, the backlight unit 20 comprises a flat rectangular case (or bezel) 22, a reflective sheet RE disposed a bottom surface of the case 22, a plurality of optical elements arranged in the case 22 and a light source unit 30 which supplies light entering the optical elements. In this embodiment, a rectangle sheet-like cushion material 50 which functions as an elastic member is installed between a bottom plate 18 of the case 22 and the reflective sheet RE. In this embodiment, the case 22 and the cushion material 50 are included as structural elements of the backlight unit 20, but the structure is not limited to this. For example, the case 22 and the cushion material 50 may be handled as components independent from the backlight unit 20.

The case 22 is formed into a rectangular flat lid-like shape from a metal plate material. The case 22 is formed, for example, from a stainless sheet having a thickness of 0.1 to 0.15 mm by processing such as folding or drawing. The case 22 includes a rectangular bottom wall 22a having dimensions (length and width) greater than those of the liquid crystal panel 12 and less than those of the cover panel 14, a pair of long-side sidewalls 22b, a pair of short-side sidewalls 22c, provided to stand on the respective side edges of the bottom wall 22a, and flanges 28 extending outwards from upper end edges of the sidewalls. In this embodiment, the long-side sidewalls 22b and the short-side sidewalls 22c are formed to stand to be substantially perpendicular to the bottom wall 22a. The height of the sidewalls 22b and 22c is slightly greatly rather than a total of the thickness of the liquid crystal panel 12, and the thickness of the backlight unit 20, which will be described later. The flanges 28 each extend outwards to be substantially perpendicular to the sidewalls 22b and 22c. In this embodiment, the flanges 28 are formed to have a width W, by which a sufficient adhesive strength can be obtained, that is, for example, 0.7 to 1 mm. In this embodiment, the bottom wall 22a, the sidewalls 22b and 22c and the flanges 28 are formed by folding one sheet metal.

A notch 32 is formed in one short-side side wall 22c. The main FPC 23 and the relay FPC 27, described above, extend outwards through the notch 32.

The case 22 is fixed to the cover panel 14 by attaching the flanges 28 to the lower surface of the cover panel 14 with a double-sided tape 34, so as to cover the liquid crystal panel 12. The flanges 28 of the sidewalls 22b and 22c are fixed to the peripheral edges of the lower surface of the cover panel 14 on an outer side of the liquid crystal panel 12, and are aligned along the respective sides of the cover panel 14. The bottom wall 22a of the case 22 is placed to be substantially parallel to the back surface of the liquid crystal panel 12 while opposing thereto with a gap therebetween. The bottom wall 22a is connected to the ground potential to form a second force sensing electrode (second detection electrode). That is, the bottom wall 22a opposes the first detection electrodes Tx1 to Txn via the optical members of the backlight unit 20 and the first substrate SUB1.

Note that for the fixation of the case 22 and the cover panel 14, a hot melt adhesive, an epoxy adhesive, a UV-curing adhesive or the like may be used, besides the double-stick tape 34.

As shown in FIG. 2 and FIG. 3, the cushion material 50 is installed on the bottom wall 22a of the case 22. The cushion material 50 is formed into a rectangular shape of dimensions substantially equal to those of the bottom wall 22a and disposed to be overlaid on substantially the entire surface of the bottom wall 22a. The backlight unit 20 comprises the rectangular reflective sheet RE disposed on the cushion material 50, a rectangular frame 52 fixedly overlaid on the peripheral portion of the reflective sheet RE, a rectangular plate-like light guide LG overlaid on the reflective sheet RE within the frame 52, a plurality of, for example, two optical sheets OS1 and OS2 stacked on the light guide LG and the light source unit 30 which inputs light to the light guide LG.

The reflective sheet RE is formed to have outer dimensions substantially equal to those of the plane of the liquid crystal panel 12, and covers substantially the entire surfaces of the bottom wall 22a and the cushion material 50. The reflective sheet RE should have a thickness of 200 μm or less, preferably, 50 to 90 μm and a reflectance of 90% or higher, preferably, 95% or higher.

The frame 52 is formed by, for example, molding a synthetic resin such as polycarbonate. Outer dimensions of the frame 52 are substantially equal to those of the polarizer PL2 of the liquid crystal panel 12. The frame 56 includes an end surface 56a located on an opposite side to the reflective sheet RE and a one-step lower stepped portion 56b formed on an inner circumference side of the end surface 56a.

The light guide LG is formed to have outer dimensions (length, width) slightly less than inner dimensions of the frame 56, and also slightly greater then outer dimensions of the display area DA of the liquid crystal panel 12 in planer view. The light guide LG is disposed in the frame 56 with a reflective surface side opposing the reflective sheet RE and laid on the reflective sheet RE. The light guide LG used here has a thickness of about 0.23 to 0.32 mm.

The incident surface of the light guide LG opposes a short side of the frame 56 with a slight gap therebetween. The light source unit 30 comprises, for example, a slender belt-like circuit board and a plurality of light sources (for example, LEDs) arranged on the circuit board. The light source unit 30 is placed within the frame 56 so that the light sources 32b oppose the incident surface of the light guide LG.

According to this embodiment, light-transmissive diffusion and prism sheets, formed from, for example, an acrylic or silicon synthetic resin are used as a first optical sheet OS1 and a second optical sheet OS2. The first optical sheet OS1 is overlaid on the emission surface of the light guide LG. The peripheral portion of the first optical sheet OS1 is laid on the stepped portion 56c of the frame 56. The second optical sheet OS2 is overlaid on the first optical sheet OS1, and further the peripheral portion of the second optical sheet OS2 is placed on the stepped section 56c of the frame 56 while being overlaid on the first optical sheet OS1. An upper surface of the peripheral portion of the second optical sheet OS2 is arranged on the same plane as that of, that is, located to be flush with the first end surface 56a of the frame 56. The number of optical sheets is not limited to two, but may be one, or three or more.

The backlight unit 20 comprises a rectangular frame shaped adhesive member (for example, double-sided tape) TP to attach the backlight unit 20 onto the liquid crystal panel 12. The adhesive member TP is attached to the first end surface 56a of the frame 56 and the peripheral portion of the second optical sheet OS2. Thus, the second optical sheet OS2 is fixed to the frame 56 via the adhesive member TP.

The backlight unit 20 configured as above is disposed in the case 22 so as to oppose the rear surface of the liquid crystal panel 12 and is attached to the polarizer PL2 of the liquid crystal panel 12 with the adhesive member TP. That is, the frame 56 is attached to the peripheral portion of the rear surface of the polarizer PL2 with the adhesive member TP, and the outer circumference of the frame 56 and the outer circumference of the adhesive member TP are aligned with the peripheral portion of the polarizer PL2.

The frame 56 is positioned to oppose the frame area ED of the liquid crystal panel 12, and the first and second optical sheets OS1 and OS2 and the light guide LG oppose the display area DA of the liquid crystal panel 12. The second optical sheet OS2 of the backlight unit 20 is placed to oppose the rear surface of the liquid crystal panel 12 with a gap (air layer) therebetween by the thickness of the adhesive member TP.

As shown in FIG. 2, the circuit board of the light source unit 30 comprises a connector terminal 31. The connector terminal 31 extends outwards through a notch of the frame 5, to be connected to the main FPC 23. Thus, a drive current is allowed to flow to the light source (LED) of the light source unit 30 via the main FPC 23 and the circuit board. The light emitted from LED enters the light guide LG from the incident surface of the light guide LG, propagates in the light guide LG or is emitted from the reflective surface of the light guide LG, and is reflected by the reflective sheet RE. Then, the emitted light once again enters the light guide LG. After passing through such an optical path, the light from the LED is emitted from the entire surface of the emission surface of the light guide LG to a liquid crystal panel 12 side. The emitted light is diffused the by the first and second optical sheets OS1 and OS2, and then irradiated to the display area DA of the liquid crystal panel 12.

Figure 4:
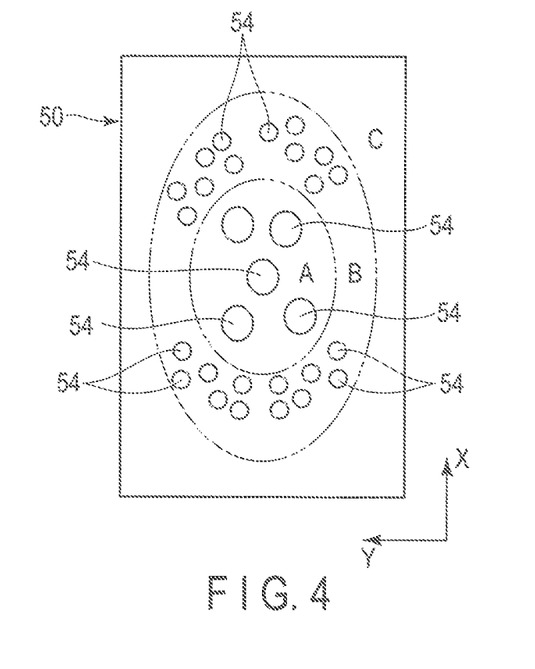
FIG. 4 is a plan view schematically showing a cushion material (elastic member).

FIG. 4 is a plan view schematically showing the cushion material 50. As shown in FIGS. 2 to 4, the cushion material 50 is formed, for example, into a rectangular sheet from an elastic material such as urethane foam, sponge or rubber. The cushion material 50 is formed have dimensions (length, width) slightly larger than those of the display area DA of the liquid crystal panel 12 in planer view and opposes the entire display area DA. The thickness of the cushion material 50 is about 0.01 to 0.6 mm, for example.

The cushion material 50 is disposed between the first detection electrodes Tx of the liquid crystal panel 12 and the second force sensing electrode (the bottom wall 22a). In this embodiment, the cushion material 50 is placed between the bottom wall (the second force sensing electrode) 22a of the case 22 and the reflective sheet RE, to abut against these.

The cushion material 50 comprises a first region A located in a central portion, a second region B located to surround the first region and a third region C located to surround the second region B and between the second region B and four side edges of the cushion material 50 along a plane direction. The first region A is formed into, for example, an elliptical shape with a long axis extending along the longitudinal direction of the cushion material 50. Similarly, the second region B is formed into an elliptical shape with a long axis extending along the longitudinal direction of the cushion material 50. The first, second and third regions A, B and C have hardnesses different from each other along the thickness direction of the cushion material 50. Here, the hardness is higher in the order of the first region A, the second region B and the third region C (A<B<C).

As shown in FIG. 4, a plurality of holes 54 are formed in the first region A and the second region B of the cushion material 50 in order to obtain the defined relationship in hardness in this embodiment. Each hole 54 penetrates the cushion material 50 along the thickness direction. The density of the holes 54 formed in the first region A (the ratio of the area of the holes 54 occupied in the area of the first region A) is set higher than that of the holes 54 formed in the second region B (the ratio of the area of the holes 54 occupied in the area of the second region B), and thus the first region A is softer, that is, more easily crushable than the second region B. In this embodiment, no holes are formed in the third region C of the cushion material 50. Therefore, the third region C is harder than the second region B. Note that a plurality of holes may be formed in the third region C. In this case, the density of the holes formed in the third region C is set lower than that of the second region B.

The relationship in hardness between the first, second and third regions A, B and C is, for example, that the hardness of the first region A is about 50% of that of the third region C, and the hardness of the second region B is about 30% of that of the third region C. The relationship in hardness is not limited to this, but may be set up various combinations of hardness by adjusting the density of the holes 54 formed. Note that the shapes of the first and second region A and B in the cushion material 50 are not limited to elliptical, but may be changed into various shapes. For example, the first region A and the second region B may as well be, for example, rectangular, polygonal, or a running track-shaped. Further, the number of regions of the cushion material 50 is not limited to three, but it suffices if at least two regions, a first region of the central portion and a second region to surround are included. Note that four or more regions may be set in the cushion material 50.

According to the liquid crystal display device 10 configured as described above, for example, a display period, a touch detection, a display period, a force sensing period and a display period are alternately repeatedly executed a plurality of times by time division in an one-frame period. In the display period, the drive IC 24 sends a display signal to a display pixel, and in the touch detection period, supplies drive signals sequentially to the first detection electrodes Tx1 to Txn of the touch sensor. Furthermore, in the force sensing period, the drive IC 24 supplies drive signals sequentially to the first detection electrodes Tx1 to Txn.

The touch IC 21 receives detection signals from the second touch detection electrodes Rx1 to Rxn of the touch sensor and detects a touch and the position coordinates of the touch based on the detection signals. That is, in a touch detection period, when an operator's finger approaches or touches the cover panel 14, the capacitance between the first detection electrodes TX and the second touch detection electrodes RX varies with respect to the touch position at the center, and the touch IC 21 receives the detection signals which contain the variation in capacitance from the second touch detection electrodes Rx1 to Rxn. Thus, the touch IC 21 detects a touch and position coordinates of the touch based on the detection signals thus received.

Further, in the force sensing period, the touch IC 21 receives detection signals from the second force sensing electrodes formed from the bottom walls 22a of the case 22 and detects the degree of the pressing force based on the detection signals. In the force sensing period, the drive IC 24 transmits sensor drive signals to the first detection electrodes Tx1 to Txn. During this state, when the operator touches the cover panel 14 with a finger or the like, the cover panel 14 and the liquid crystal panel 12 is slightly warped towards the backlight unit 20 side with respect to the pressed portion at the center by the pressing force of the touch. Due to the warping, the first detection electrodes Tx1 to Txn are displaced and moved towards the backlight unit 20 side, that is, the bottom wall (the second force sensing electrode) 22a side, thereby varying the distances between each of the first detection electrodes Tx and the second force sensing electrode (bottom wall 22a). With the variation in distance, the electrostatic capacitance between the first electrode 62a and the second electrode 64a is varied, and the touch IC 21 receives the detection signals which contain the electrostatic capacitance variation from the second force sensing electrode. The touch IC 21 detects the pressed state (pressing force) on the cover panel 14 based on the signals thus received. In the liquid crystal display device 10, when the input of a predetermined pressing force of, for example, 2 to 3 N is detected by the pressure sensor described above, the drive IC 24 executes arbitrary actions such as screen switching, screen expansion and selection of a operation upon detection of the pressing force as a trigger.

On the other hand, due to the pressing force by the touch, the cover panel 14 and the liquid crystal panel 12 are slightly warped towards the backlight unit 20 side with respect to the pressed portion as the center. If this amount of warping exceeds the thickness of the air layer (gap) between the backlight unit 20 and the liquid crystal panel 12, the liquid crystal panel 12 presses the cushion material 50 via the first and second optical sheets OS1 and OS2, the light guide LG and the reflective sheet RE. Thus, the cushion material 50 is pressed and elastically deformed in the compressing direction (the thickness direction), that is, crushed. Thereby, the first detection electrodes Tx1 to Txn of the liquid crystal panel 12 can be displaced towards the second force sensing electrode (22a) side by the crushing amount of the cushion material 50 in addition to the thickness of the air layer, thereby making it possible to secure a relatively large amount of warping, and a displacement amount. Therefore, even a larger pressing force can be detected.

The amount of displacement of each of the first detection electrodes Tx1 to Txn changes according to the location of the pressing force applied. To explain, central portions of the cover panel 14 and the liquid crystal panel 12 can be relatively easily warped as compared to peripheral portions, and therefore if the pressing force of the same degree is applied, the amount of warping of the central portions is greater as compared with the amount of warping of the peripheral portions. Further, since the peripheral portions of the cover panel 14 and the liquid crystal panel 12 are supported by the frame 56 of the backlight unit 20, they cannot be easily warped as compared to the central portions. That is, when the pressing force of the same degree is applied, the amount of bending of a peripheral portion becomes small as compared with the amount of bending of the central portion.

Figure 10:
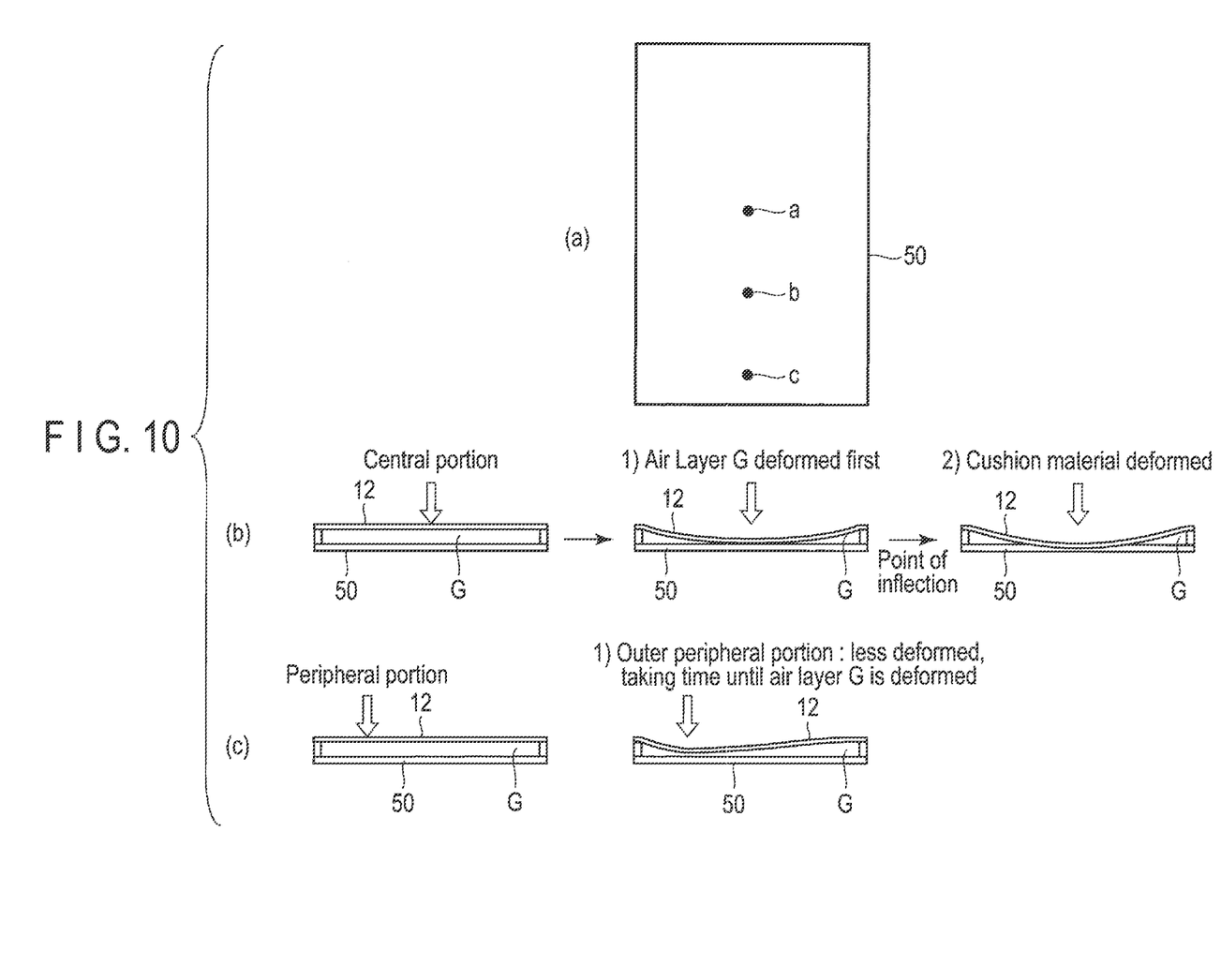
FIG. 10 is a plan view schematically showing the deformation states of the display panel and the cushion material in various cases where the cushion material of the display device of a comparative example, and a central portion of the display panel of a comparative example are pressed, and a peripheral part of the display panel of the comparative example is pressed.
Figure 11:
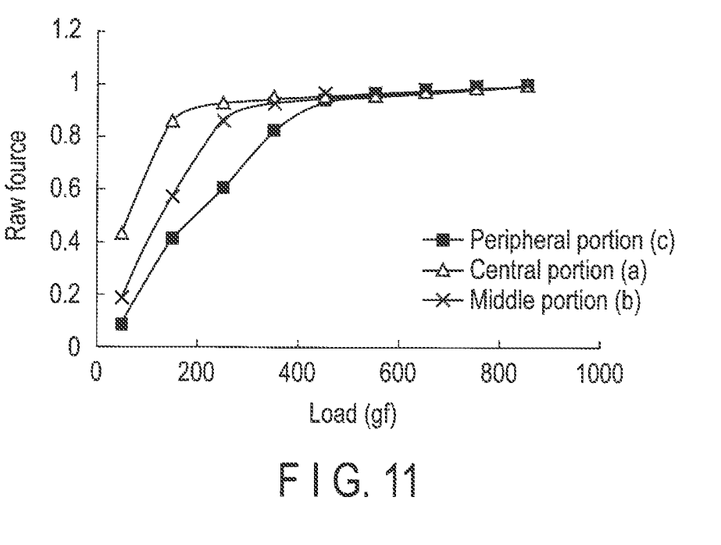
FIG. 11 is a diagram showing the relationship between the pressing force applied on the display panel and the amount of displacement of the display panel in the comparative example, as compared to each other with respect to the position where the pressing force is applied.

FIG. 10 shows a cushion material of a display device according to a comparative example, together with schematic illustrations of a warped state of the display panel when the central portion of the display panel 12 is pressed and also a warped state of the display panel when a peripheral portion of the display panel is pressed in the comparative example. FIG. 11 shows the relationship between the pressing force applied onto the display panel of the display device according to the comparative example and the amount of displacement of the first detection electrodes Tx for locations of application of pressing force (at three places: a central portion a, a middle portion b, and a peripheral portion c of the display panel).

As shown in FIG. 10, the cushion material 50 of the display device according to the comparative example is formed have a uniform thickness and uniform hardness over the entire surface. The amount of displacement of the display panel 12 containing the first detection electrodes is varied according to the location of the pressing force applied. That is, the central portion a of the display panel 12 can be easily warped as compared to the peripheral portion c, and therefore when the pressing force of the same size is applied, the amount of warping at the central portion is greater as compared to that of the peripheral portion. Further, the peripheral portion c of the display panel 12 is supported by the frame 56 of the backlight unit 20, it cannot be easily warped as compared to the central portion a. That is, when the pressing force of the same degree is applied, the amount of warping at the peripheral portion is less as compared to that of the central portion.

If a pressing force is applied onto the central portion a of the display panel 12 as shown in (b) in FIG. 10, the central portion of the display panel 12 is warped towards the cushion material 50 side and first, the air layer G is crushed. Further, the central portion of the display panel 12 is displaced to depress the central portion of the cushion material 50. When the display panel 12 is thus displaced towards the cushion material 50 side according to the pressing force applied, the rate of the amount of displacement with respect to the pressing force while moving in the air layer (gap) G between the backlight unit 20 and the display panel 12 (a first displacement zone) and the rate of the amount of displacement with respect to the pressing force while depressing the cushion material 50 after abutting thereto (a second displacement zone) are different from each other. Therefore, as shown in FIG. 11, a point of inflection in the amount of displacement is created on the boundary of the first displacement zone and the second displacement zone. Further, the location of the point of inflection varies depending on the location of the pressing force applied, namely, the central portion a, the middle portion b and the peripheral portion c.

In contrast, according to this embodiment, the first region A in the central portion of the cushion material 50 it formed softer, that is, more easily depressable, than the surrounding second region B and third region C. With this configuration, when the amount of warping of the central portion of the liquid crystal panel 12 is great, the first region A of the cushion material 50 is depressed to secure the displaceable amount of the first detection electrodes TX, making it possible to detect great pressing force. On the other hand, the amount of warping in the peripheral portion of the liquid crystal panel 12 is less as compared to that of the central portion, and therefore when the second region B and the third region C of the cushion material 50 is hardened in this order, it becomes possible to secure deformation of the cushion material in accordance with the amount of warping of the peripheral portion.

Figure 5:
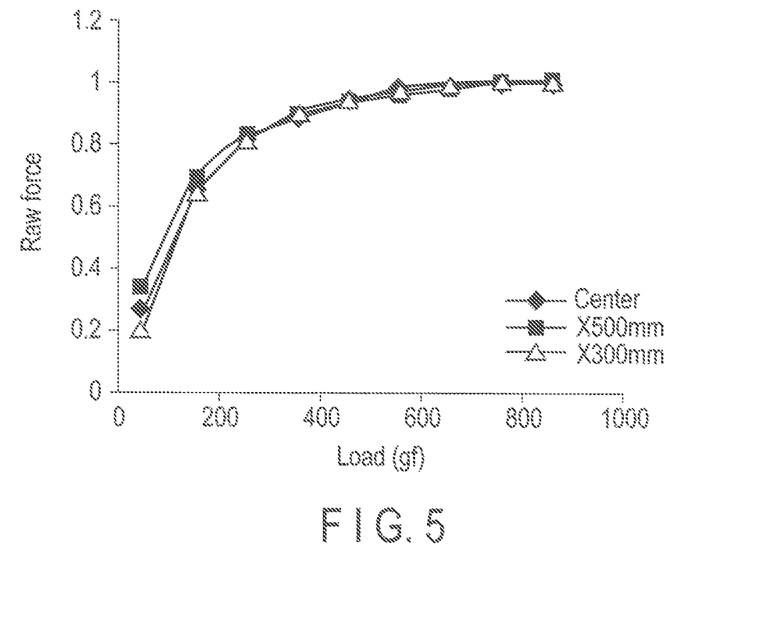
FIG. 5 is a diagram showing the relationship between a pressing force (load) and a raw force (a relative amount of gap displacement in standardization that the amount of displacement when 800 g of load is set as 1.0) in a pressure detection sensor.

FIG. 5 shows the relationship between the pressing force applied onto the cover panel 14 and the amount of displacement of the first detection electrodes Tx at each of various locations where the pressing force is applied (three locations: the central portion along the first direction X, a location 500 mm distant from an end along the first direction X, a location 300 mm distant from the end along the first direction X), as compared to each other. In FIG. 5, the horizontal axis shows the load (pressing force) gf and the vertical axis shows Raw Force (a relative amount of gap displacement in standardization that the amount of displacement when 800 g of load is set as 1.0).

According to this embodiment, the cushion material 50 is divided into the first, second and third regions A, B and C to have different hardnesses, or more specifically, the second region B and the third region C are formed harder in this order than the first region A in the central portion. With this structure, the amount of depression of the cushion material 50 at each respective region can be made equivalent to the amount of displacement of the first detection electrodes Tx according to the location of the pressing force applied. Therefore, as shown in FIG. 5, the inclination at the point of inflection between the first displacement zone and the second displacement zone can be lessen and the points of inflection at the three locations are brought close to each other or to overlap each other. Thus, the detection value according to the location of the pressing force applied can be corrected easily (calibration), thereby making it possible to carry out the detection of pressing force with precision uniformly over the entire display surface of the liquid crystal display device 10.

According to this embodiment, a display device which can carry out excellent force sensing over the entire region can be obtained.

Next, elastic members (cushion material) of display devices according to modifications will be described. In the modification described below, the same structural parts as those of the above-described first embodiment will be designated by the same referential symbols, and detailed descriptions therefor will be omitted or abbreviated. Mainly, different aspects from those of the embodiment will be explained in detail.

(First Modification)

Figure 6:
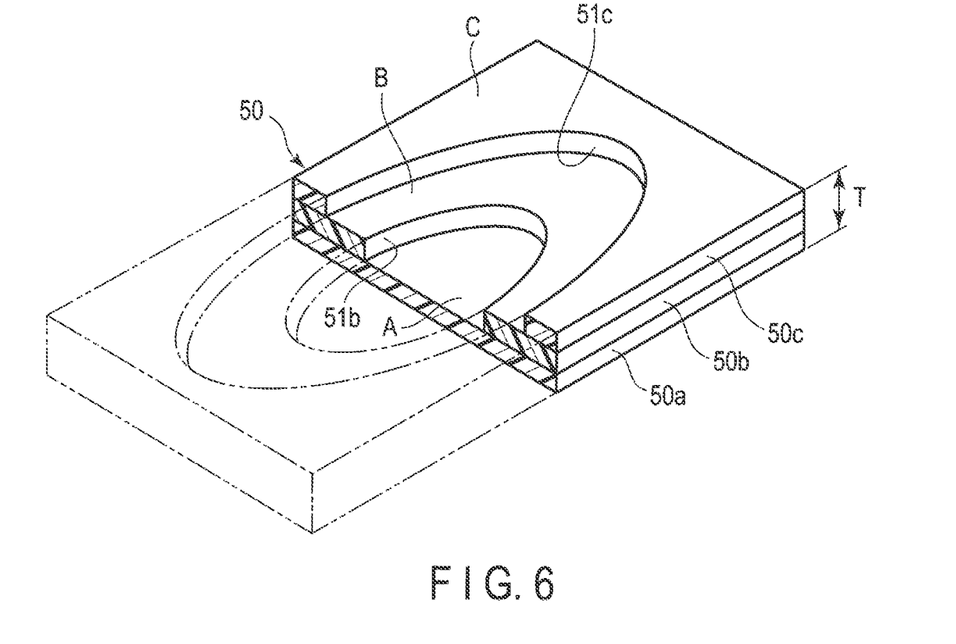
FIG. 6 is a partially cross sectional perspective view showing the cushion material of a liquid crystal display according to a first modification.

FIG. 6 is a partially cross sectional perspective view an elastic member (cushion material) of a display device according to the first modification. As shown in the figure, the cushion material 50, as the elastic member, is formed, for example, from an elastic material such as urethane foam, sponge or rubber, into a rectangular sheet.

The cushion material 50 comprises a first region A located in a central portion, a second region B located to surround the first region and a third region C located to surround the second region B and between the second region B and four side edges of the cushion material 50 along a plane direction. The first region A is formed into, for example, an elliptical shape with a long axis extending along the longitudinal direction of the cushion material 50. Similarly, the second region B is formed into an elliptical shape with a long axis extending along the longitudinal direction of the cushion material 50.

In this modification, the first, second and third regions A, B and C are formed to have different thicknesses. More specifically, the first region A is formed to be thinnest, and the second region B and the third region C are thicker than the first region A in this order. As compared to a thickness T of the cushion material 50, the thickness of the first region A is set to about 30%, that of the second region B is set to about 60%, and that of the third region C is set to 100%. Thus, the hardness along the thickness direction of the cushion material 50 differs from one region to another other. Here, these regions are formed to have the following relationship: the hardness increases in the order of the first region A, the second region B and the third region C (A<B<C).

In the first modification, three cushion sheets 50a, 50b and 50c are stacked on one another to form the cushion material 50. The lowermost cushion sheet 50a includes the first region A. The second layer cushion sheet 50b includes an elliptical opening 51b corresponding to the first region A and the second region B formed around the opening 51b. The uppermost cushion sheet 50c includes an elliptical opening 51c corresponding to the second region B and the third region C formed around the opening 51c.

With use of the cushion material 50 configured as above, an advantageous effect similar to that of the first embodiment described above can be obtained.

In the first modification, the structure is not limited to a plurality of cushion sheets stacking one another, but a single cushion material may be adopted with a recessed portion corresponding to the first region A, and another recessed portion corresponding to the second region B.

(Second Modification)

Figure 7:
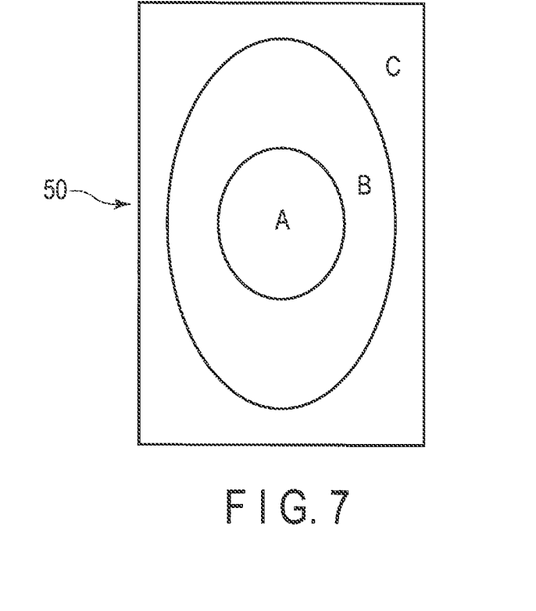
FIG. 7 is a plan view showing the cushion material of a liquid crystal display according to a second modification.

FIG. 7 is a plan view showing an elastic member (cushion material) of a display device according to the second modification. As shown in the figure, the cushion material 50, as the elastic member, is formed, for example, from an elastic material such as urethane foam, sponge or rubber, into a rectangular sheet.

The cushion material 50 comprises a first region A located in a central portion, a second region B located to surround the first region and a third region C located to surround the second region B and between the second region B and four side edges of the cushion material 50 along a plane direction. The first region A is formed into, for example, an elliptical shape with a long axis extending along the longitudinal direction of the cushion material 50. Similarly, the second region B is formed into an elliptical shape with a long axis extending along the longitudinal direction of the cushion material 50.

In this modification, the first, second and third regions A, B and C are formed from materials having different hardnesses. More specifically, the first region A is formed from a softest or most easily breakable material, and the second region B is of a harder material than that of the first region A. The third region C is of a harder material than that of the second region B. These materials may be, for example, of a plurality of members of different hardnesses prepared from the same material, or of a plurality of different materials having different harnesses.

With use of the cushion material 50 configured as above, an advantageous effect similar to that of the first embodiment described above can be obtained.

In the first and second modifications, the shape of the first region A or the second region B in the cushion material 50 is not limited to elliptical, but may be changed into various shapes. For example, the first region A and the second region B may as well be, for example, rectangular, polygonal, or a running track-shaped. Further, the number of regions of the cushion material 50 is not limited to three, but it suffices if at least two regions, a first region of the central portion and a second region to surround are included. Note that four or more regions may be set in the cushion material 50.

(Third Modification)

Figure 8:
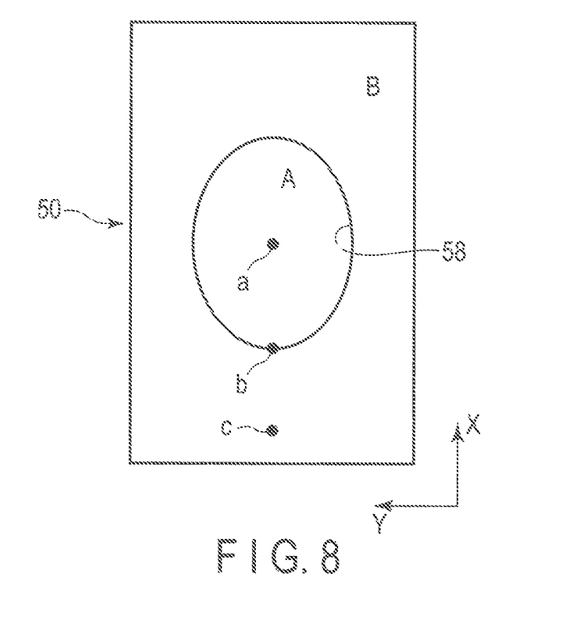
FIG. 8 is a plan view showing the cushion material of a liquid crystal display according to a third modification.

FIG. 8 is a plan view showing an elastic member (cushion material) of a display device according to the third modification. As shown in the figure, the cushion material 50, as the elastic member, is formed, for example, from an elastic material such as urethane foam, sponge or rubber, into a rectangular sheet.

The cushion material 50 comprises a first region A located in a central portion and a second region B located to surround the first region along a plane direction. The first region A is formed into, for example, an elliptical shape with a long axis extending along the longitudinal direction of the cushion material 50. In this modification, the first region A is formed as an elliptical opening (hole) 54. That is, the density of the hole in the first region A is 100%, and that of the hole in the second region B is 0%. In other words, the density of the cushion material in the first region A is 0%, and the density of the cushion material in the second region B is 100%. Thus, the second region B of the cushion material 50 is formed harder than the first region A.

Figure 9:
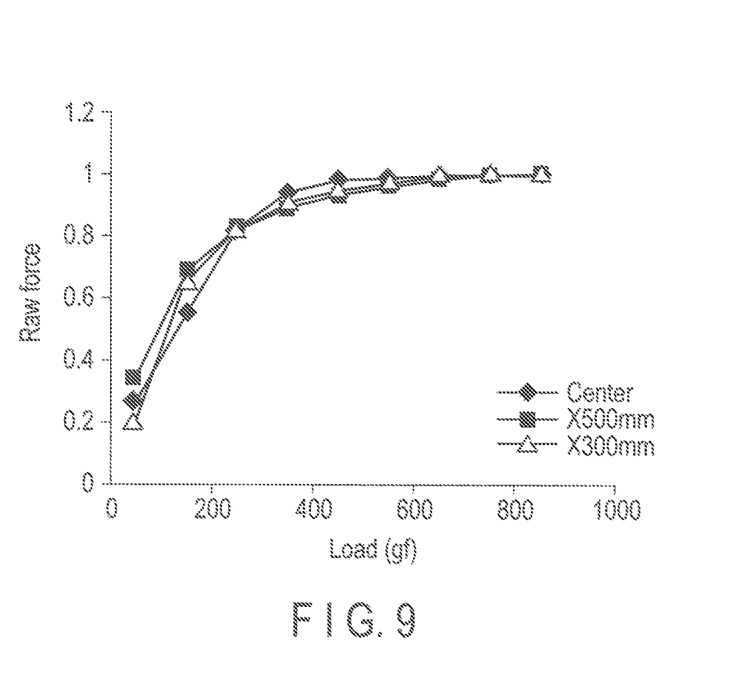
FIG. 9 is a graph showing the relationship between the pressing force and the amount of displacement in the third modification.

FIG. 9 shows the relationship between the pressing force applied onto the cover panel and the amount of displacement of the first detection electrodes Tx at each of various locations where the pressing force is applied (point a: the central portion along the first direction X; point b: a location 500 mm distant from an end along the first direction X, point c: a location 300 mm distant from the end along the first direction X), as compared to each other. In FIG. 9, the horizontal axis shows the load (pressing force) gf and the vertical axis shows Raw Force (a relative amount of gap displacement).

According to the third modification, the first region A of the cushion material 50 is formed as the opening 54 to make the second region B harder than the first region A, and thus the amount of deformation at each location of the cushion material 50 can be made equivalent to the amount of displacement of the first detection electrodes Tx according to the location of the pressing force applied. Therefore, as shown in FIG. 9, the inclination at the point of inflection at each of the locations a, b and c can be lessen and the points of inflection at the three locations are brought close to each other. Thus, the detection value according to the location of the pressing force applied can be corrected easily (calibration), thereby making it possible to carry out the detection of pressing force with precision uniformly over the entire display surface of the liquid crystal display device 10.

In third modification, the shape of the first region A, that is, the shape of the hole, is not limited to elliptical, but may be changed into various shapes. For example, the first region A and the second region B may as well be, for example, rectangular, polygonal, or a running track-shaped.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Based on the structures which have been described in the above-described embodiment and variations, a person having ordinary skill in the art may achieve structures with arbitral design changes; however, as long as they fall within the scope and spirit of the present invention, such structures are encompassed by the scope of the present invention. Furthermore, regarding the present embodiments, any advantage and effect those will be obvious from the description of the specification or arbitrarily conceived by a skilled person are naturally considered achievable by the present invention.

The external and internal shapes of the structural members of the liquid crystal panel and the backlight unit are not limited to a rectangle. One or both of them may be polygonal, circular, elliptical or combination of any of these in plan view. The materials or dimensions of the structural members are not limited to those described in the examples provided above, and may be selected from various types.

The display panel is not limited to a transmissive type, but other display panels such as of a transreflective type and an organic EL type may be adopted as well.

What is claimed is:

1. A display device comprising:
   a display panel comprising a first substrate including a display area and a first detection electrode;
   a backlight device opposed to the first substrate with a gap therebetween;
   a second detection electrode opposing the first detection electrode via the backlight device; and
   an elastic member between the backlight device and the second detection electrode, comprising a first region opposing a central portion of the backlight device and a second region located to surround the first region, the first region and the second region being different in hardness in a thickness direction of the elastic member,
   wherein the elastic member comprises a plurality of holes formed in the first region and the second region, and a density of the holes in the first region is higher than that of the holes in the second region.

2. The display device of claim 1, wherein
   the elastic member further comprises a third region located to surround the second region, and the third region and the second region are different from each other in hardness in the thickness direction of the elastic member.

3. The display device of claim 2, wherein
   the second region is harder than the first region and less harder than the third region.

4. The display device of claim 1, wherein
   the second region is harder than the first region.

5. The display device of claim 1, wherein
   the first region and the second region of the elastic member are formed of materials of hardnesses different from each other respectively.

6. The display device of claim 1, wherein
   the first region and the second region of the elastic member are different from each other in thickness in the thickness direction.

7. A display device comprising:
   a liquid crystal panel comprising a first substrate, a second substrate opposing the first substrate, a liquid crystal layer between the first substrate and the second substrate, and a first detection electrode on the first substrate or the second substrate;
   a backlight device opposed to the first substrate via an air layer, and comprising a light guide, an optical sheet on the light guide and a light source which input light into the light guide;
   a second detection electrode opposing the first detection electrode via the backlight device; and
   an elastic member between the backlight device and the second detection electrode, comprising a first region opposing a central portion of the backlight device and a second region located to surround the first region, the first region and the second region being different in hardness in a thickness direction of the elastic member, wherein the elastic member comprises a plurality of holes formed in the first region and the second region, and a density of the holes in the first region is higher than that of the holes in the second region.

8. The display device of claim 7, wherein the elastic member further comprises a third region located to surround the second region, and the third region and the second region are different from each other in hardness in the thickness direction of the elastic member.

9. The display device of claim 8, wherein the second region is harder than the first region and less harder than the third region.

10. The display device of claim 7, wherein the second region is harder than the first region.

11. The display device of claim 7, wherein the first region and the second region of the elastic member are formed of materials of hardnesses different from each other respectively.

12. The display device of claim 7, wherein the first region and the second region of the elastic member are different from each other in thickness in the thickness direction.

\* \* \* \* \*